US012461688B2

(12) United States Patent
Wu

(10) Patent No.: US 12,461,688 B2
(45) Date of Patent: Nov. 4, 2025

(54) READ BUFFER ALLOCATION BALANCE BETWEEN MULTIPLE MEMORY DIES

(71) Applicant: Micron Technology, Inc., Boise, ID (US)

(72) Inventor: Wenjun Wu, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 10 days.

(21) Appl. No.: 18/402,573

(22) Filed: Jan. 2, 2024

(65) Prior Publication Data
US 2024/0231694 A1  Jul. 11, 2024

Related U.S. Application Data

(60) Provisional application No. 63/479,484, filed on Jan. 11, 2023.

(51) Int. Cl.
*G06F 3/00* (2006.01)
*G06F 3/06* (2006.01)

(52) U.S. Cl.
CPC .......... *G06F 3/0659* (2013.01); *G06F 3/0604* (2013.01); *G06F 3/0631* (2013.01); *G06F 3/0679* (2013.01)

(58) Field of Classification Search
CPC .... G06F 3/0659; G06F 3/0604; G06F 3/0631; G06F 3/0679
See application file for complete search history.

(56) References Cited

U.S. PATENT DOCUMENTS

| | | | |
|---|---|---|---|
| 2020/0304142 A1* | 9/2020 | Nakanishi | H03M 7/3059 |
| 2022/0083274 A1* | 3/2022 | Cho | G06F 3/064 |
| 2022/0138065 A1* | 5/2022 | Secatch | G06F 3/0679 |
| | | | 714/6.12 |

* cited by examiner

*Primary Examiner* — Craig S Goldschmidt
(74) *Attorney, Agent, or Firm* — Holland & Hart LLP

(57) ABSTRACT

Methods, systems, and devices for read buffer allocation balance between multiple memory dies are described. A memory system may transfer multiple device commands to various command queues in which each queue is associated with a respective memory die of the memory system. The memory system may determine an order for execution of the commands based on amounts of a buffer currently allocated to each memory die, amounts of a buffer request for each command, or both. The memory system may process the commands of each queue based on the order for execution and allocate buffer to respective memory dies based on the processed commands. The memory system may perform the commands, deallocate respective portions of the buffer associated with the commands, and transfer more device commands to each command queue.

20 Claims, 8 Drawing Sheets

READ BUFFER ALLOCATION BALANCE BETWEEN MULTIPLE MEMORY DIES

CROSS REFERENCE

The present Application for Patent claims the benefit of U.S. Provisional Patent Application No. 63/479,484 by WU, entitled "READ BUFFER ALLOCATION BALANCE BETWEEN MULTIPLE MEMORY DIES," filed Jan. 11, 2023, assigned to the assignee hereof, and expressly incorporated by reference in its entirety herein.

FIELD OF TECHNOLOGY

The following relates to one or more systems for memory, including read buffer allocation balance between multiple memory dies.

BACKGROUND

Memory devices are widely used to store information in various electronic devices such as computers, user devices, wireless communication devices, cameras, digital displays, and the like. Information is stored by programming memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read (e.g., sense, detect, retrieve, identify, determine, evaluate) the state of one or more memory cells within the memory device. To store information, a component may write (e.g., program, set, assign) one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be described in terms of volatile configurations or non-volatile configurations. Volatile memory cells (e.g., DRAM) may lose their programmed states over time unless they are periodically refreshed by an external power source. Non-volatile memory cells (e.g., NAND) may maintain their programmed states for extended periods of time even in the absence of an external power source.

DETAILED DESCRIPTION

Figure 1:
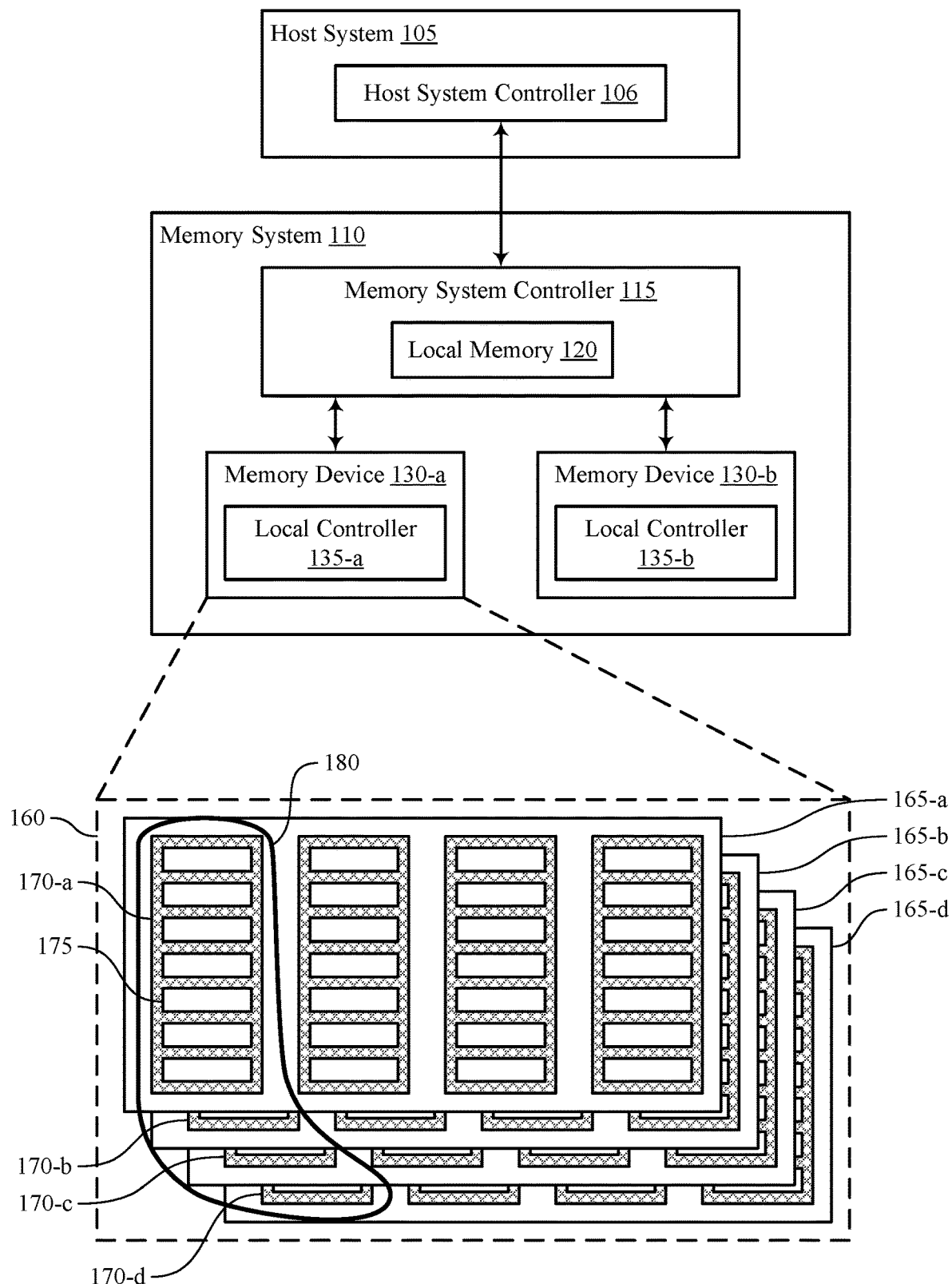
FIG. 1 through 3 illustrate examples of systems that support read buffer allocation balance between multiple memory dies in accordance with examples as disclosed herein.

Memory systems may perform various operations associated with receiving, reading, and processing commands. For example, a host system may transfer various commands (e.g., read commands, write commands, access commands) to a memory system. The memory system may queue the commands by the order received and process the commands according to the order (e.g., first-in-first-out, sequential order). In some cases, to process a command, the memory system may determine an amount of a buffer necessary to read the command and allocate that amount to respective memory dies of the memory system. The memory system may then process the command using the allocated buffer. In some examples, the memory system may process multiple commands across multiple memory dies. For example, each command may be partitioned across one or more memory dies and the memory system may allocate various portions of the buffer to the respective dies in order to process the commands. Based on the different sizes of each command (e.g., transfer length, quantity of bytes associated with each command), the various commands may be partitioned unevenly across each die (e.g., a command may be associated with two out of four memory dies, or may read more data from the two dies than the other dies), causing some dies to request more buffer than others. However, processing the commands based on a sequential order may cause one or more dies to be idle if other dies utilize all of the available buffer, which may result in increased latency and reduced efficiency for processing commands. For example, if a first command is partitioned across two dies that utilize all of the available buffer and a second command (in the queue after the first command) is associated with other dies, then the second command may be blocked (e.g., unable to be processed) until the buffer allocated to the two dies is released (e.g., freed, deallocated) and available for the other dies to utilize.

The techniques described herein enable a memory system to balance read buffer allocation between multiple memory dies, which may result in more efficient command processing, reduced latency, and increased throughput. For instance, the memory system may transfer multiple device commands (e.g., commands associated with one or more operations of the memory system) to various command queues (e.g., back-end command queues) in which each queue is associated with a respective memory die of the memory system. The memory system may determine an order for execution of the commands based on amounts of a buffer currently allocated to each memory die, amounts of a buffer request for each command, or both. The memory system may process the commands of each queue based on the order for execution and allocate buffer to respective memory dies based on the processed commands. The memory system may perform the commands, deallocate respective portions of the buffer associated with the commands, and transfer more device commands to each command queue. In some cases, the memory system may limit the amounts of buffer available to each memory die (e.g., each buffer may be allowed a portion of the total amount of buffer available), which may result in a more balanced allocation of buffer to each memory die (e.g., preventing a single memory die from using all of the buffer, utilizing each memory die that has an associated command) while affording sufficient buffer to keep the die busy.

Figure 2:
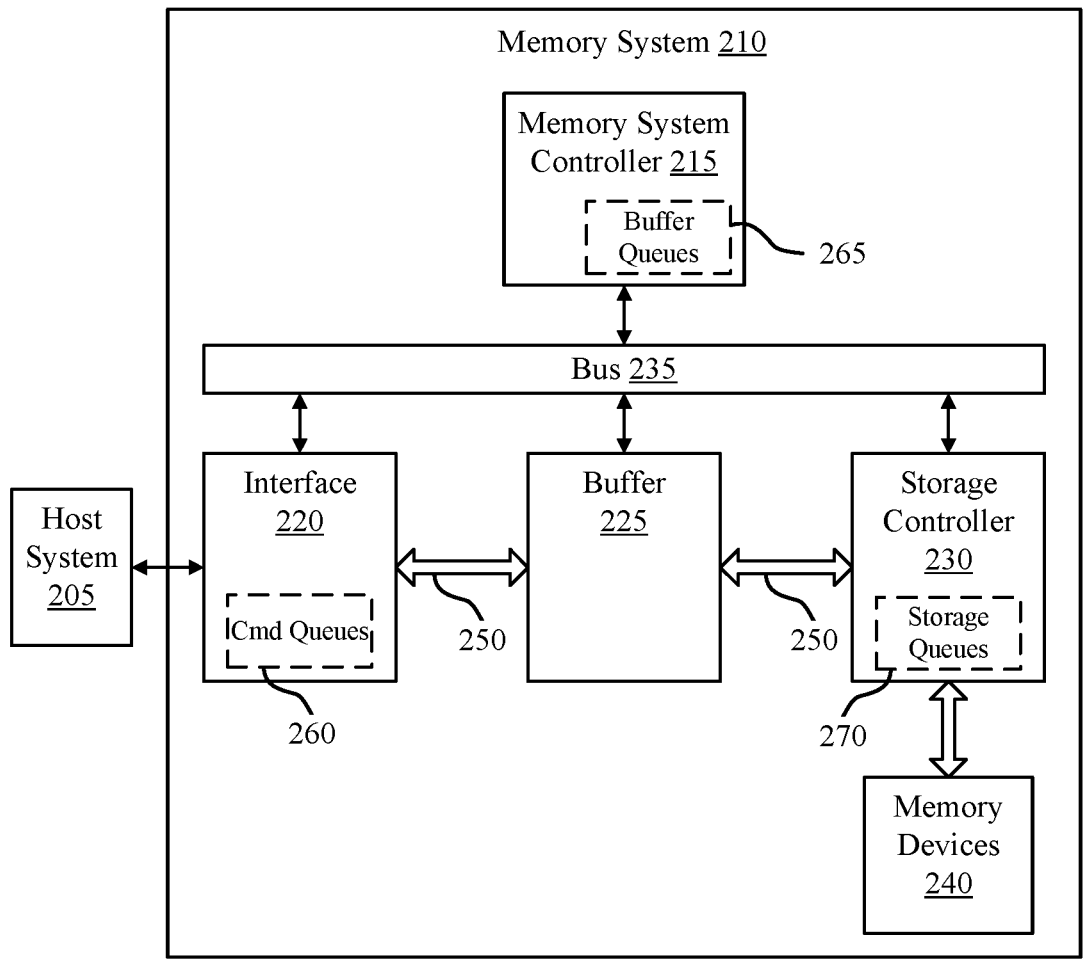
Figure 3:
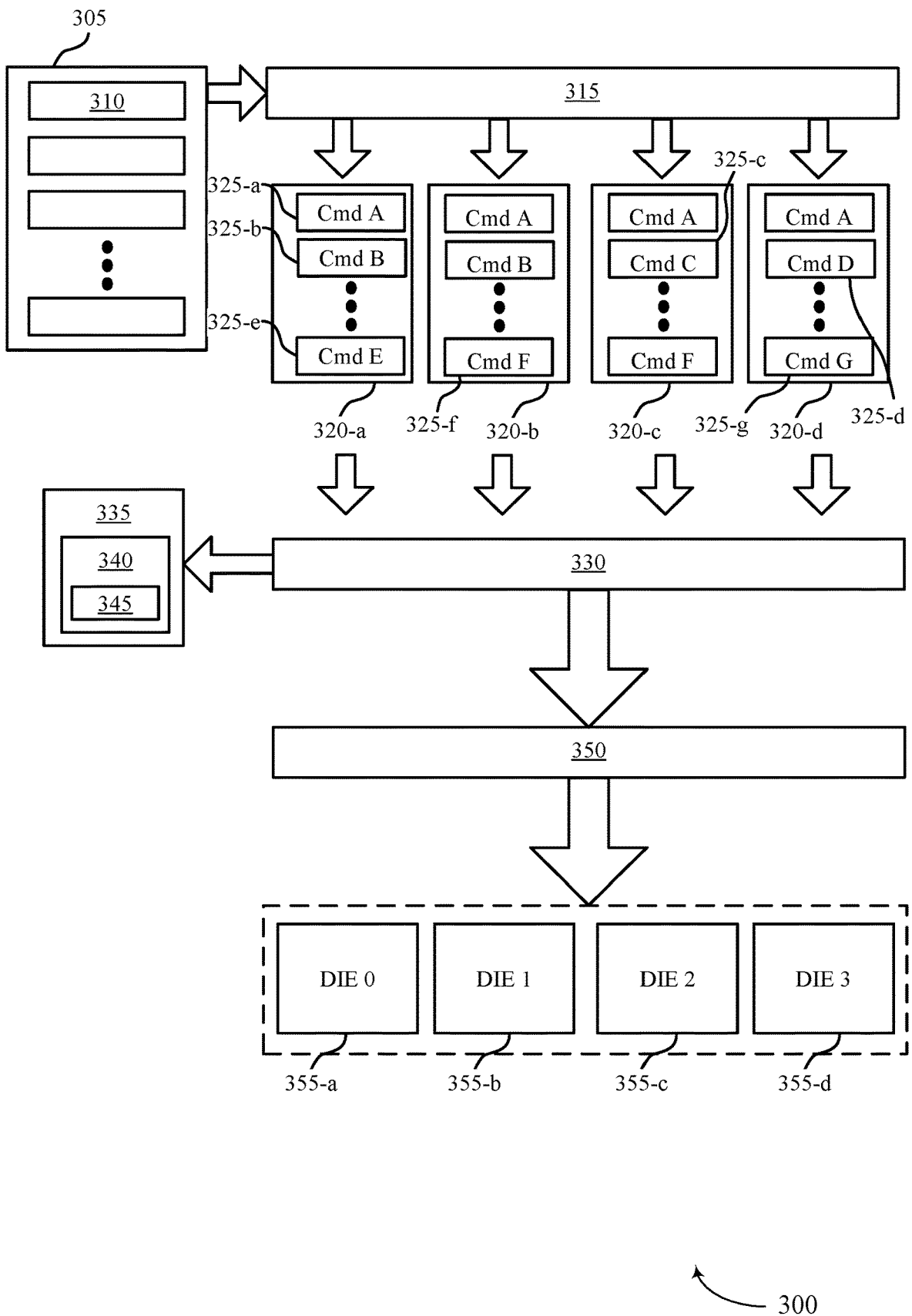

Features of the disclosure are initially described in the context of systems, devices, and circuits with reference to FIGS. 1 through 3. Features of the disclosure are described in the context of process flows with reference to FIGS. 4 and 5. These and other features of the disclosure are further illustrated by and described in the context of an apparatus diagram and flowchart that relate to read buffer allocation balance between multiple memory dies with reference to FIGS. 6 through 8.

FIG. 1 illustrates an example of a system 100 that supports read buffer allocation balance between multiple memory dies in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include one or more memory system controllers 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

A memory system controller 115 may be coupled with and communicate with the host system 105 (e.g., via the physical host interface) and may be an example of a controller or control component configured to cause the memory system 110 to perform various operations in accordance with examples as described herein. a memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more array's of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

The system 100 may include any quantity of non-transitory computer readable media that support read buffer allocation balance between multiple memory dies. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Some memory systems 110 may perform various operations associated with receiving, reading, and processing commands. For example, a host system 105 may transfer various commands (e.g., read commands, write commands, access commands) to a memory system 110. The memory system 110 may queue the commands by the order received and process the commands according to the order (e.g., first-in-first-out, sequential order). In some cases, to process a command, the memory system 110 may determine an amount of a buffer necessary to read the command and allocate that amount to respective memory dies 160 of the memory system 110. The memory system 110 may then process the command using the allocated buffer. In some examples, the memory system 110 may process multiple commands across multiple memory dies 160. For example, each command may be partitioned across one or more memory dies 160 and the memory system 110 may allocate various portions of the buffer to the respective dies 160 in order to process the commands. Based on the different sizes of each command (e.g., transfer length, quantity of bytes associated with each command), the various commands may be partitioned unevenly across each memory die 160 (e.g., a command may be associated with two out of four memory dies, or may read more data from the two dies than the other dies), causing some dies 160 to request more buffer than others. However, processing the commands based on a sequential order may cause one or more memory dies 160 to be idle if other memory dies 160 utilize all of the available buffer, which may result in increased latency and reduced efficiency for processing commands.

The techniques described herein enable a memory system 110 to balance read buffer allocation between multiple memory dies 160, which may result in more efficient command processing, reduced latency, and increased throughput. For instance, the memory system 110 may transfer multiple device commands (e.g., commands associated with one or more operations of the memory system) to various command queues (e.g., back-end command queues) in which each queue is associated with a respective memory die 160 of the memory system 110. The memory system 110 may determine an order for execution of the commands based on amounts of a buffer currently allocated to each memory die 160, amounts of a buffer request for each command, or both. The memory system 110 may process the commands of each queue based on the order for execution and allocate buffer to respective memory dies 160 based on the processed commands. The memory system 110 may perform the commands, deallocate respective portions of the buffer associated with the commands, and transfer more device commands to each command queue. In some cases, the memory system 110 may limit the amounts of buffer available to each memory die 160 (e.g., each buffer may be allowed a portion of the total amount of buffer), which may result in a more balanced allocation of buffer to each memory die 160 (e.g., preventing a single memory die from using all of the buffer, utilizing each memory die that has an associated command) while affording sufficient buffer to keep the memory die 160 busy.

FIG. 2 illustrates an example of a system 200 that supports read buffer allocation balance between multiple memory dies in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory. STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240). In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front-end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back-end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) once the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

Once the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260).

For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

Some memory systems 210 may perform various operations associated with receiving, reading, and processing device commands. For example, a host system 205 may transfer various device commands (e.g., commands that perform various access or other operations) to a memory system 210. The memory system 210 may queue the commands in the order received and process the commands according to the order (e.g., first-in-first-out, sequential order). In some cases, to process a command, the memory system 210 may determine an amount of a buffer 225 necessary to process the command and allocate that amount to respective memory dies 160 of the memory system 210. The memory system 210 may then process the command using the allocated buffer (e.g., an address of the buffer 225). In some examples, the memory system 210) may process multiple commands across multiple memory dies 160. For example, each command may be partitioned across one or more memory dies 160 and the memory system 210 may allocate various portions of the buffer 225 to the respective dies 160 in order to process the commands. Based on the different sizes of each command (e.g., transfer length, quantity of bytes associated with each command), the various commands may be partitioned unevenly across each memory die 160 (e.g., a command may be associated with two out of four memory dies), causing some dies 160 to request more of the buffer 225 (e.g., more buffer addresses) than others. However, processing the commands based on a sequential order may cause one or more memory dies 160 to be idle if other memory dies 160 utilize all of the available buffer 225, which may result in increased latency and reduced efficiency for processing commands.

The techniques described herein enable a memory system 210 to balance read buffer allocation between multiple memory dies 160, which may result in more efficient command processing, reduced latency, and increased throughput. For instance, the memory system 210 may transfer multiple device commands (e.g., commands associated with one or more operations of the memory system) from various command queues 260 (e.g., front-end command queues) to various storage queues 270) (e.g., back-end command queues) in which each queue 270) is associated with a respective memory die 160 of the memory system 210. The memory system 210 may determine an order for execution of the commands based on amounts of a buffer 225 currently allocated to each memory die 160, amounts of a buffer request for each command, or both. The memory system 210 may process the commands of each queue 270 based on the order for execution and allocate buffer to respective memory dies 160 based on the processed commands. The memory system 210 may perform the commands, deallocate respective portions of the buffer 225 associated with the commands, and transfer more device commands to each storage queue 270. In some cases, the memory system 110 may limit the amounts of buffer 225 available to each memory die 160 (e.g., each buffer may be allowed a portion of the total amount of buffer available), which may result in a more balanced allocation of the buffer 225 to each memory die 160 (e.g., preventing a single memory die from using all of the buffer, utilizing each memory die that has an associated command) while still affording sufficient amounts of the buffer 225 to keep the memory dies 160 busy. In some implementations, the various queues (e.g., back-end and front-end command queues) may be implemented in hardware or firmware (e.g., virtual queues).

FIG. 3 illustrates an example of a system 300 that supports read buffer allocation balance between multiple memory dies in accordance with examples as disclosed herein. The system 300 may be an example of a system 100 and a system 200 as described with reference to FIGS. 1 and 2, or aspects thereof. The system 300 may be a memory system (e.g., memory system 110, memory system 210) configured to store data received from a host system (e.g., host system 105, host system 205) and to send data to the host system, if requested by the host system using access commands (e.g., read commands or write commands). The system 300 may implement aspects of the system 100 and the system 200 as described herein with reference to FIGS. 1 and 2. For example, the one or more memory dies related to system 300 (e.g., memory dies 355-*a*, 355-*b*, 355-*c*, and/or 355-*d*) may be an example of memory die 160 and the queues 305, 320, and 340 may be examples of the queues 260, 270, and 265, respectively. In some cases, the various components depicted in the example of FIG. 3 may be in different locations than represented or be implemented by the system as firmware (e.g., instructions for performing the functions that support read buffer allocation balance between multiple memory dies). For example, the buffer queue 340 may be a sub-component of a buffer manager 335, in a different location of the system 300 outside of the buffer manager 335, or implemented as firmware.

The system 300 may include various components to support read buffer allocation balance between memory dies. For example, the system 300 may include a first queue 305 (e.g., a front-end queue), a data path 315, a second queue 320 (e.g., one or more back-end queues), a command scheduler 330, a buffer manager 335, a third queue 340 (e.g., a buffer queue), a back-end interface 350, and memory dies 355.

In some cases, data may be transferred from one component to another along various communication paths within the system 300. For example, the first queue 305 may communicate with a host system 205 and support storing (e.g., queueing) multiple device commands 310 associated with one or more operations (e.g., read, write, access operations) of the system 300. The data path 315 may support transferring the device commands 310 (e.g., front-end commands) to the second queues 320, where the second queues 320 may support storing commands 325 (e.g., back-end commands). The second queues 320 may be in communication with the command scheduler 330, which may be in communication with the buffer manager 335. Additionally, the command scheduler 330 may communicate with the back-end interface 350 and the back-end interface 350 may communicate with the memory dies 355 based on the commands 325.

In some examples, a memory system 210 may process one or more commands 310 in the order received. For example, the host system 205 may transfer the commands 310 (e.g., read commands) to the memory system 210. The memory system 210 may store the commands 310 in the first queue 305 according to the order received (e.g., sequential order, first-in-first-out). In some cases, a memory system controller 215 may determine physical addresses (e.g., of a memory die 355) associated with the commands 310 and issue the commands 325 to read the data stored at the physical addresses according to the order. The buffer manager 335 may allocate buffer for each command 325 to store the data read as the commands 325 are being executed. For example, each command 310 may be associated with a buffer request 345 that indicates a quantity of buffer associated with the data of the command (e.g., transfer length, chunk size). The buffer manager 335 may allocate that quantity of buffer if available. Once the command is executed, the data may be transferred from the buffer to the host system 205 and the buffer may be deallocated (e.g., freed, made available for further storage).

In some cases, the buffer may be finite and allocated for use in executing multiple commands across multiple memory dies 355. For example, the memory system controller 215 may execute multiple commands 325 concurrently that span one or more memory dies 355. The commands 325 may be received by the memory system 210 in an order represented by A-G of the commands (e.g., command 325-*a* first, followed by command 325-*b*, and so on to command 325-*g*). Each of the commands may be associated with one or more of the memory dies 355. For example, command 325-*a* may be associated with a first, second, third, and fourth memory dies 355, command 325-*b* may be associated with the first and second memory dies 355, command 325-*c* may be associated with the third memory die 355, command 325-*d* may be associated with the fourth memory die 355, command 325-*e* may be associated with the first memory die, command 325-*f* may be associated with the second and third memory dies 355, and command 325-*g* may be associated with the fourth memory die 355. Some commands may utilize an unequal quantity of the buffer per memory die 355 (e.g., based on a size of the data being read from the memory die 355) such that some memory dies 355 may utilize larger portions of the buffer than others.

If the memory system controller 215 executes the commands 325 in the order received (e.g., commands 325-*a* being executed before commands 325-*b* and 325-*c* of another host command), then larger portions of the buffer may be allocated to some memory dies 355 compared to portions allocated to other memory dies 355. Because the buffer is finite, if some of the memory dies 355 utilize the majority of the buffer, then the interfaces that read data from the other memory dies 355 that have minimal buffer allocated (e.g., insufficient buffer to stay busy, no buffer allocated) may be idle as the interfaces wait for buffer to be allocated to the other memory dies 355.

The techniques described herein may support a more balanced read buffer allocation between the memory dies 355. For example, the system 300 may utilize a scheduling procedure (e.g., a scheduler algorithm, process flow 500) to balance the buffer allocation. The algorithm may include determining an order for processing (e.g., traversing) the second queues 320, processing (e.g., traversing) the commands 325 associated with the second queues 320 according to the order, allocating buffer to the memory dies 355 based on processing the commands 325, executing the commands 325, and fetching (e.g., transferring) more commands 310 to the second queues 320.

In some cases, determining an order for processing the second queues 320 may be based on respective amounts of the buffer allocated to the memory dies 355. In some cases, the order may be from the least amount of buffer to the most amount of buffer. For example, the command scheduler 330 may determine the order by identifying which of the second queues 320 has the least amount of buffer allocated (e.g., current buffer allocation before processing the commands 325).

In some examples, the command scheduler 330 may determine that the queue 320-a associated with the first memory die 355 has less buffer allocated than any of the other queues, and may process the queue 320-a. The command scheduler 330 may determine an order for execution of the commands 325 based on an amount of the buffer already allocated to the first memory die 355 and a buffer request amount associated with each command 325 (e.g., an amount of buffer to fulfil the command 325). In some cases, the order for execution may be different from an order of reception of the commands 325. For instance, the command scheduler 330 may determine the order for execution to be first the command 325-a, then command 325-c, then command 325-d, then command 325-f, then command 325-b, then command 325-g, and finally command 325-e. In some cases, the system 300 may process one or more of the device commands 325 associated with the queues 320 based on determining the order for processing the queues, the order for execution, or both.

Figure 4:
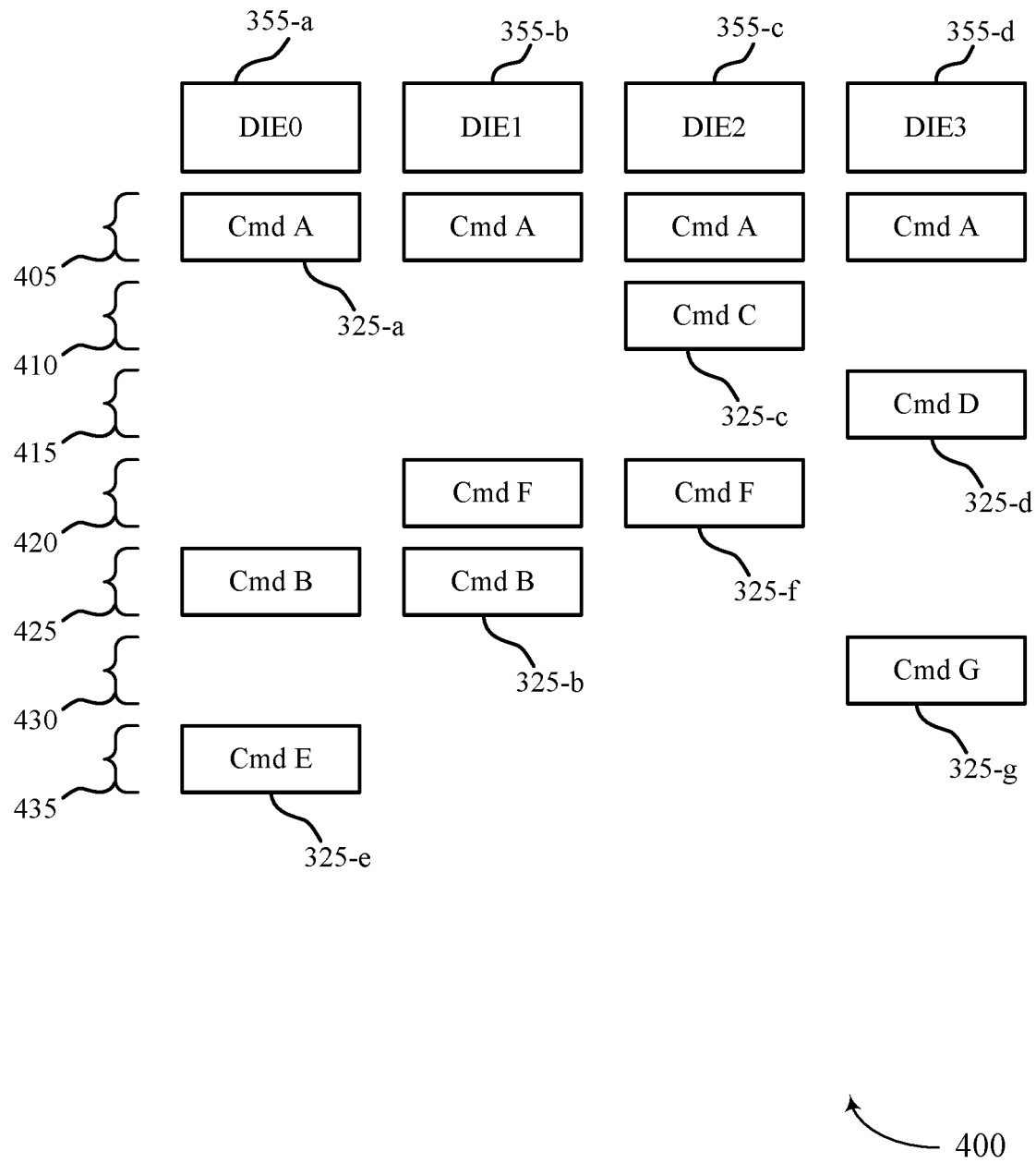
FIGS. 4 and 5 illustrate examples of process flows that support read buffer allocation balance between multiple memory dies in accordance with examples as disclosed herein.

In the illustration of FIG. 4, the process flow 400 may be an example of processing the various memory dies 355 and their respective commands 325. For example, at 405, the system 300 may process a first command (e.g., command 325-a) which may span across the memory die 355.

In some cases, processing the first command may include the command scheduler 330 generating (e.g., modifying) a buffer request 345 associated with the first command. The buffer request 345 may include buffer allocated to each of the memory dies 355, however amounts allocated to each of the memory dies 355 may not be the same. The command scheduler 330 may determine whether the command 325-a is the last command in the queue 320-a, or that the buffer request 345 satisfies a threshold (e.g., a total buffer request limit per memory die 355), or both. In some implementations, the threshold may be a limit X that may be both less than the total buffer amount in the system 300 and large enough to allow a memory die 355 to maintain a busy interface for a period of time. This may prevent a single memory die 355 from utilizing (e.g., being allocated) an overabundance of the buffer in a single loop (as described herein with reference to FIG. 5) and give opportunity to a following command to be distributed to other memory dies 355 (e.g., preventing the other memory dies 355 from being idle). If the queue 320-a is empty or the buffer request 345 satisfies the threshold, then the command scheduler 330 may modify a flag (e.g., set the flag to be TRUE) associated with the first memory die 355 (e.g., with the queue 320-a). For example, the flag (e.g., traverse done flag) may be an indication that the queue 320-a has been traversed (e.g., processed). In some implementations, the system 300 may determine whether each queue 320 has been processed based on respective flags for each queue 320.

Similarly, at 410, the system 300 may determine that the queue 320-c associated with the third memory die 355-c has less buffer allocated than any of the other queues (e.g., based on having less buffer allocated for command 325-a than the other memory dies 355), and may process the queue 320-c. Processing the queue 320-c may include a buffer request 345 for allocating buffer to the third die 355-c for command 325-c.

At 415, the system 300 may determine that the queue 320-d associated with the fourth memory die 355-d has less buffer allocated than any of the other queues (e.g., based on having less buffer allocated and not freed for commands 325-a or 325-c than the other memory dies 355), and may process the queue 320-d. Processing the queue 320-d may include a buffer request 345 for allocating buffer to the fourth die 355-d for command 325-d.

At 420, the system 300 may determine that the queue 320-b associated with the second memory die 355-b has less buffer allocated than any of the other queues (e.g., based on having less buffer allocated and not freed for previous commands than the other memory dies 355), and may process the queue 320-b. Processing the queue 320-b may include a buffer request 345 for allocating buffer to the second die 355-b and the third die 355-c for command 325-f.

At 425, the system 300 may determine that the queue 320-a associated with the first memory die 355-a has less buffer allocated than any of the other queues (e.g., based on having less buffer allocated and not freed for previous commands than the other memory dies 355), and may process the queue 320-a. Processing the queue 320-a at 425 may include a buffer request 345 for allocating buffer to the first die 355-a and the second die 355-b for command 325-b.

At 430, the system 300 may determine that the queue 320-d associated with the fourth memory die 355-d has less buffer allocated than any of the other queues (e.g., based on having less buffer allocated and not freed for previous commands than the other memory dies 355), and may process the queue 320-d. Processing the queue 320-d at 430 may include a buffer request 345 for allocating buffer to the fourth die 355-d for command 325-g.

At 435, the system 300 may determine that the queue 320-a associated with the first memory die 355-a has less buffer allocated than any of the other queues (e.g., based on having less buffer allocated and not freed for previous commands than the other memory dies 355), and may process the queue 320-a. Processing the queue 320-d at 435 may include a buffer request 345 for allocating buffer to the first die 355-a for command 325-e.

In some cases, the command scheduler 330 may determine an order for processing the memory dies 355 different from the order received. For example, although commands 325-a through 325-g may be received in a first order, buffer may be allocated to the commands in a second, different order.

At each of 405-435, the command scheduler 330 may, in processing a command for a memory die 355, send a buffer request 345 to the buffer manager 335. The buffer manager 335 may determine whether an amount of the buffer request 345 associated with the memory die 355 satisfies a first threshold (e.g., the buffer amount allocated for the memory die 355 for this loop of processing commands for the memory die 355 exceeds, or meets or exceeds, the limit X). If the amount of the buffer request 345 associated with the memory die 355 does not satisfy the threshold, the command scheduler 330 may process additional commands in the queue 320 associated with the memory die 355. When the amount of the buffer requests 345 associated with the memory die 355 satisfies the threshold, the buffer manager 335 may indicate that the amount of the buffer requests 345 satisfy the first threshold. The command scheduler may set a flag (e.g., traverse done flag) for the memory die 355, indicating that the queue 320 associated with the memory die 355 has been traversed (e.g., processed), and may select another memory die 355 (e.g., according to the memory die 355 having the lowest amount of buffer allocated) for processing of additional commands. Additionally or alternatively, the buffer manager 335 may, in processing the buffer requests 345 for a memory die 355, determine whether a total amount of buffer allocated to the memory die 355 satisfies a second threshold (e.g., the total buffer amount allocated for the memory die 355, including the buffer allocated in the current loop and in previous loops and not freed, exceeds, or meets or exceeds the limit Y). If the total amount of buffer satisfies the second threshold, the buffer manager 335 may indicate that the total amount of buffer satisfies the second threshold to the command scheduler 330. The command scheduler 330) may set the flag indicating that the memory die 355 has been traversed, and select another memory die 355 for processing of commands. When all the queues 320 associated with each memory die 355 have been traversed, the system 300 may clear the flags associated with each of the memory die 355.

The example of FIG. 4 depicts one possible ordering of the memory dies 355 and the commands 325 associated with each memory die 355. Other orderings are possible.

In some examples, the buffer manager 335 may allocate respective portions of the buffer (e.g., amounts of buffer less than the first threshold) to each respective memory dies 355 according to the order for execution of the device commands 325. For example, if the buffer manager 335 determines that the amount of buffer requests 345 for a given memory die 355 does not satisfy the second threshold (e.g., is below the second threshold), then the buffer manager 335 may push (e.g., transfer) a success response to the command scheduler 330 and allocate the second quantity of buffer associated with the buffer request 345 to the respective memory die 355. If the buffer manager 335 determines that the total amount of buffer for a given memory die 355 (e.g., the amount previously allocated for the given memory die 355 and not freed combined with the amount of buffer requests 345) satisfies the second threshold, then the buffer manager 335 may queue (e.g., store, pend) the buffer requests 345 in the buffer queue 340) until the total amount of buffer does not satisfy the second threshold (e.g., until sufficient amounts of the buffer amount allocated for the given memory die 355 are freed), at which point the buffer manager 335 may push the success response and allocate the second quantity of buffer. In some cases, the system 300 may perform the device commands 325 (e.g., read the associated memory cells at the address given by the device commands 325 and store the data from the memory cells into the respective memory die 355) based on allocating the second quantity of buffer. The system 300 may output, to the host system 205, the data associated with the device commands 325 and deallocate (e.g., free) the respective portions of the buffer associated with the data from the respective memory die 355 to be used for another command 325.

Once each queue 320) has been processed (e.g., each respective flag is set to TRUE), the system 300 may transfer a second set of device commands 310 to the second queues 320) and clear each respective flag of the second queues 320 (e.g., each respective flag is set to FALSE). In some cases, transferring the second set of device commands may give an opportunity to an idle memory die 355 to process more workload once there is an imbalance between the memory dies 355. The loop (as described herein with reference to FIG. 5) may then be repeated for a second set of device commands 325.

Figure 5:
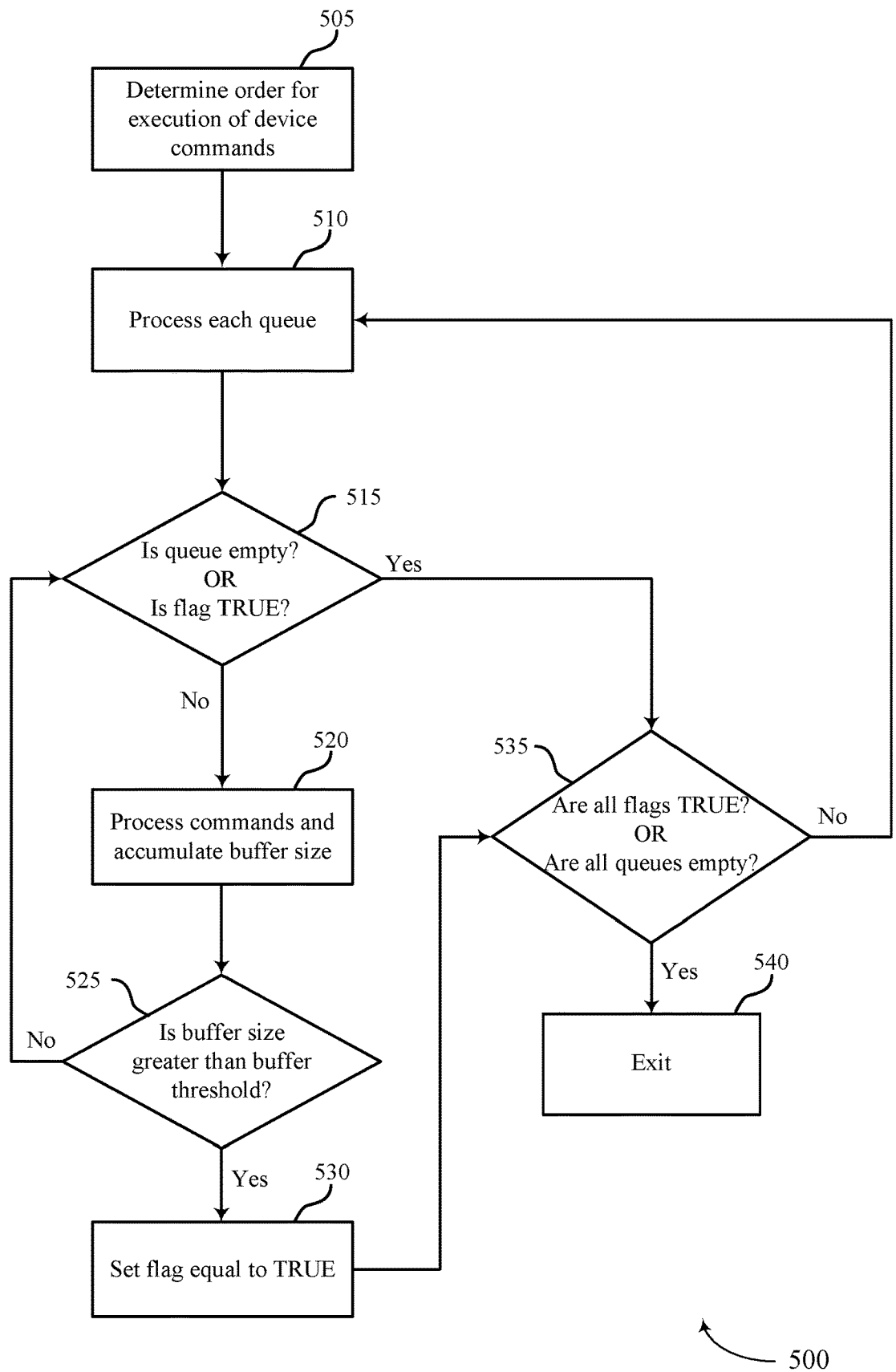

FIG. 5 illustrates an example of a process flow 500 that supports read buffer allocation balance between multiple memory dies in accordance with examples as disclosed herein. Aspects of the process flow 500 may be implemented by a controller, among other components. Additionally, or alternatively, aspects of the process flow 500 may be implemented as instructions stored in memory (e.g., firmware stored in a memory coupled with a memory device). For example, the instructions, when executed by a controller (e.g., the memory system), may cause the controller to perform the operation of the process flow 500. The process flow 500 may be implemented by a device such as a memory device or a memory system as described herein with reference to FIGS. 1 through 4. By implementing the process flow 500, the system may improve performance, efficiency, and latency for executing device commands (e.g., read commands) and a more balanced allocation of read buffer between memory dies.

At 505, the system may determine an order for execution of device commands (e.g., commands 325). For example, the system may determine that a first die (e.g., memory die 355) has less buffer allocated (e.g., is less busy) than a second die. The system may determine the order for executing the device commands associated with the first die based on the buffer request amount of each device command and the amount of buffer already allocated to the first die.

At 510, the system may process each queue (e.g., queues 320). For example, at 515, the system may determine whether a first queue is empty or a first flag associated with the first queue is TRUE. If the queue is not empty and the first flag is FALSE, then, at 520, the system may process the first queue. For instance, the system may traverse the first queue one command at a time. At the first command of the first queue, the system may generate a buffer request (e.g., buffer request 345) based on a first buffer request amount associated with the first command (e.g., a size of the data associated with the command). If the first queue is empty, then the system may set the flag to be TRUE and go to step 535.

At 525, after each command is processed, the system may determine whether the buffer size (e.g., the combination of each buffer request amount of this loop) satisfies a first threshold (e.g., is greater than, or greater than or equal to the first threshold). For example, the system may determine that the first buffer request amount is less than the first threshold and go back to step 515. At a second command of the first queue, the system may modify the buffer request to include both the first buffer request amount and a second buffer request amount. At 525, the system may also determine whether the total buffer allocated to the memory die satisfies a second threshold. For example, the system may determine whether the combination of buffer allocated for this loop and previous loops that has not been freed satisfies the second threshold. The system may determine that the combination of the first buffer request amount and the second buffer request amount satisfies the first threshold, or that the total buffer allocated satisfies the second threshold. Based on the determination, at 530, the system may set the first flag as TRUE. In some cases, the first threshold may be set to be less than a total amount of the total buffer of the system and more than a minimum amount to allow each memory die a sufficient amount of time processing the data (e.g., 32 KB). In some examples, each memory die may be associated with a respective first or second threshold.

At 535, the system may determine whether each respective flag for all of the queues are TRUE or if all of the queues are empty. If each respective flag is TRUE or the queues are empty, then the system will exit the loop at 540 and reset (e.g., clear, set to FALSE) each respective flag. Else, the system will go back to step 510 and process a second queue.

Figure 6:
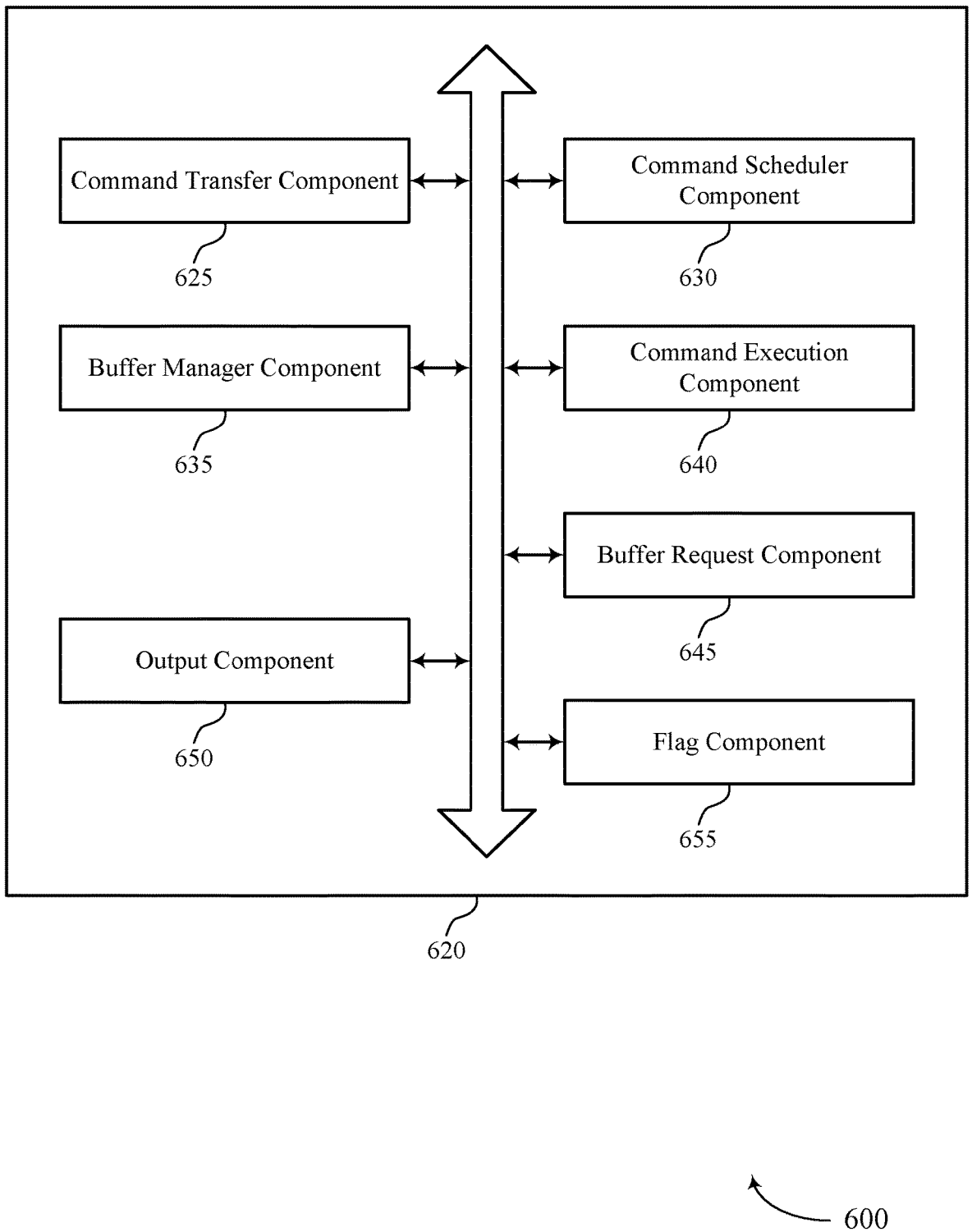
FIG. 6 illustrates a block diagram of a memory system that supports read buffer allocation balance between multiple memory dies in accordance with examples as disclosed herein.

FIG. 6 illustrates a block diagram 600 of a memory system 620 that supports read buffer allocation balance between multiple memory dies in accordance with examples as disclosed herein. The memory system 620 may be an example of aspects of a memory system as described with reference to FIGS. 1 through 5. The memory system 620, or various components thereof, may be an example of means for performing various aspects of read buffer allocation balance between multiple memory dies as described herein. For example, the memory system 620 may include a command transfer component 625, a command scheduler component 630, a buffer manager component 635, a command execution component 640, a buffer request component 645, an output component 650, a flag component 655, or any combination thereof. Each of these components may communicate, directly or indirectly, with one another (e.g., via one or more buses).

The command transfer component 625 may be configured as or otherwise support a means for transferring a plurality of device commands to a plurality of queues, each of the plurality of queues associated with a respective memory die of a plurality of memory dies of a memory system, the plurality of device commands associated with one or more operations of the memory system. The command scheduler component 630 may be configured as or otherwise support a means for determining an order for execution of the plurality of device commands based at least in part on respective amounts of a buffer allocated to the plurality of memory dies. The buffer manager component 635 may be configured as or otherwise support a means for allocating respective portions of the buffer to respective memory dies of the plurality of memory dies according to the order for execution of the plurality of device commands. The command execution component 640 may be configured as or otherwise support a means for performing one or more of the plurality of device commands associated with the respective memory dies of the plurality of memory dies based at least in part on allocating the respective portions of the buffer.

In some examples, the command scheduler component 630 may be configured as or otherwise support a means for determining an order for processing the plurality of queues based at least in part on the respective amounts of the buffer allocated to the plurality of memory dies. In some examples, the command execution component 640 may be configured as or otherwise support a means for processing one or more device commands of the plurality of device commands associated with a first queue based at least in part on determining the order for processing the plurality of queues. In some examples, the buffer request component 645 may be configured as or otherwise support a means for modifying a buffer request amount associated with the first queue based at least in part on processing the one or more device commands of the plurality of device commands associated with the first queue. In some examples, the buffer manager component 635 may be configured as or otherwise support a means for determining whether the buffer request amount satisfies a first threshold based at least in part on modifying the buffer request amount.

In some examples, the flag component 655 may be configured as or otherwise support a means for modifying a flag associated with the first queue based at least in part on determining that the buffer request amount satisfies the first threshold.

In some examples, the flag component 655 may be configured as or otherwise support a means for determining whether each queue of the plurality of queues have been processed based at least in part on respective flags of a plurality of flags associated with the plurality of queues.

In some examples, the buffer request component 645 may be configured as or otherwise support a means for generating a buffer request associated with a first memory die of the plurality of memory dies associated with the first queue based at least in part on the one or more device commands.

In some examples, the command scheduler component 630 may be configured as or otherwise support a means for determining an order for processing the plurality of queues based at least in part on the respective amounts of the buffer allocated to the plurality of memory dies. In some examples, the command execution component 640 may be configured as or otherwise support a means for identifying a first device command of the plurality of device commands associated with a first queue based at least in part on determining the order for processing the plurality of queues, the first queue associated with a first memory die of the plurality of memory dies. In some examples, the buffer manager component 635 may be configured as or otherwise support a means for determining whether a combination of a first quantity associated with the respective portions of the buffer allocated to the first memory die and a second quantity associated with a buffer request for the first device command satisfies a second threshold.

In some examples, the buffer manager component 635 may be configured as or otherwise support a means for determining to suppress a request for the second quantity associated with the buffer request for the first device command based at least in part on determining that the combination satisfies the second threshold.

In some examples, to support allocating the respective portions of the buffer to the respective memory dies, the buffer manager component 635 may be configured as or otherwise support a means for allocating the second quantity of the buffer to the first memory die based at least in part on determining that the combination does not satisfy the second threshold.

In some examples, the buffer manager component 635 may be configured as or otherwise support a means for storing the first quantity associated with the respective portions of the buffer allocated to the plurality of memory dies and the second quantity associated with the buffer request based at least in part on the buffer request, where determining whether the combination satisfies the second threshold is based at least in part on the storing.

In some examples, the command execution component 640 may be configured as or otherwise support a means for processing the plurality of queues based at least in part on transferring the plurality of device commands to the plurality of queues. In some examples, the command transfer component 625 may be configured as or otherwise support a means for transferring a second plurality of device commands to the plurality of queues associated with the respective memory dies of the plurality of memory dies of the memory system based at least in part on determining that the plurality of queues have been processed.

In some examples, the output component 650 may be configured as or otherwise support a means for outputting, to a host device, data associated with the one or more of the plurality of device commands based at least in part on performing the one or more of the plurality of device commands. In some examples, the buffer manager component 635 may be configured as or otherwise support a means for deallocating the respective portions of the buffer based at least in part outputting the data.

Figure 7:
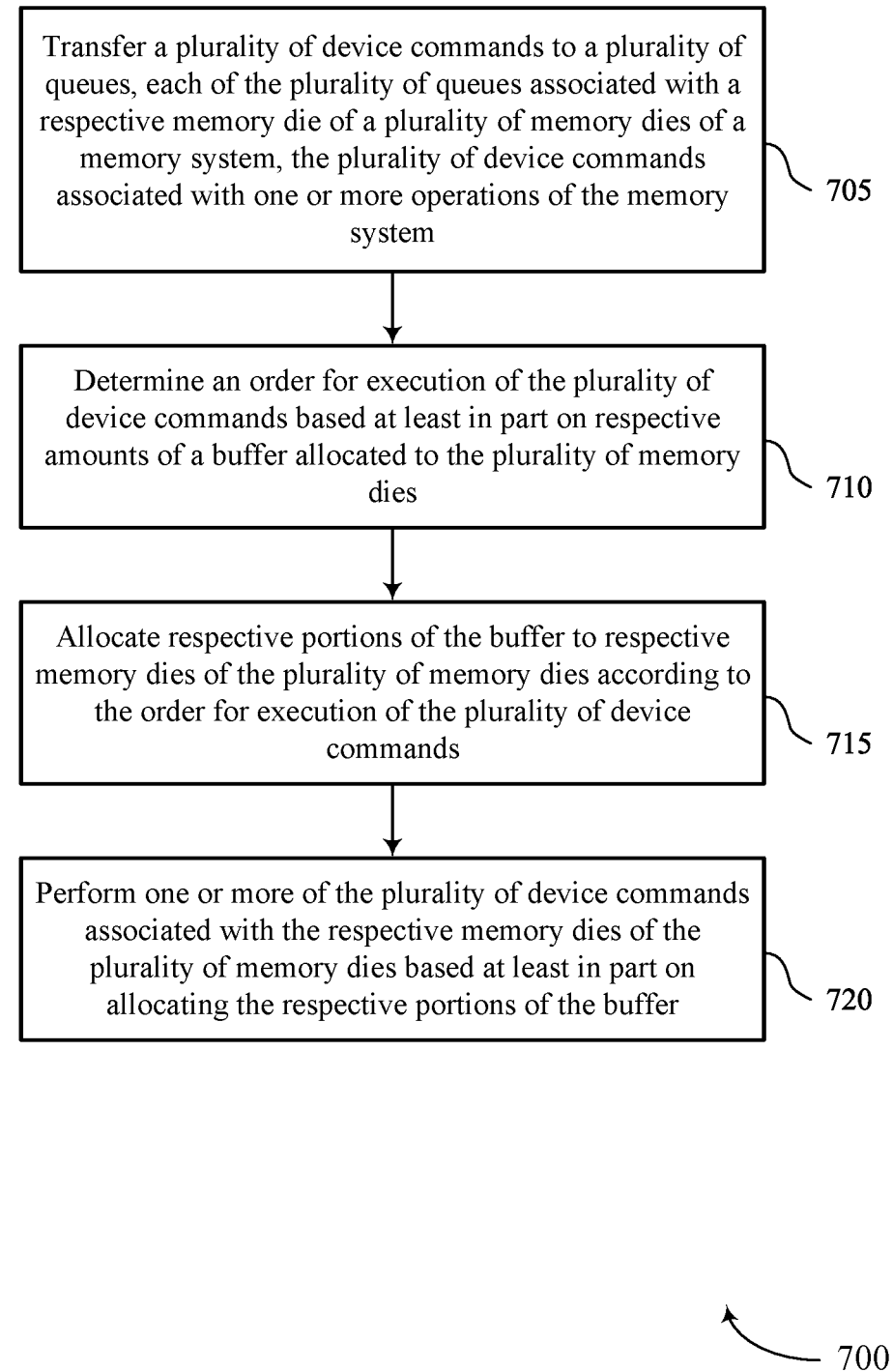
FIGS. 7 and 8 illustrate flowcharts showing a method or methods that support read buffer allocation balance between multiple memory dies in accordance with examples as disclosed herein.

FIG. 7 illustrates a flowchart showing a method 700 that supports read buffer allocation balance between multiple memory dies in accordance with examples as disclosed herein. The operations of method 700 may be implemented by a memory system or its components as described herein. For example, the operations of method 700 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 705, the method may include transferring a plurality of device commands to a plurality of queues, each of the plurality of queues associated with a respective memory die of a plurality of memory dies of a memory system, the plurality of device commands associated with one or more operations of the memory system. The operations of 705 may be performed in accordance with examples as disclosed herein. In some examples, aspects of the operations of 705 may be performed by a command transfer component 625 as described with reference to FIG. 6.

At 710, the method may include determining an order for execution of the plurality of device commands based at least in part on respective amounts of a buffer allocated to the plurality of memory dies. The operations of 710 may be performed in accordance with examples as disclosed herein. In some examples, aspects of the operations of 710 may be performed by a command scheduler component 630 as described with reference to FIG. 6.

At 715, the method may include allocating respective portions of the buffer to respective memory dies of the plurality of memory dies according to the order for execution of the plurality of device commands. The operations of 715 may be performed in accordance with examples as disclosed herein. In some examples, aspects of the operations of 715 may be performed by a buffer manager component 635 as described with reference to FIG. 6.

At 720, the method may include performing one or more of the plurality of device commands associated with the respective memory dies of the plurality of memory dies based at least in part on allocating the respective portions of the buffer. The operations of 720 may be performed in accordance with examples as disclosed herein. In some examples, aspects of the operations of 720 may be performed by a command execution component 640 as described with reference to FIG. 6.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for transferring a plurality of device commands to a plurality of queues, each of the plurality of queues associated with a respective memory die of a plurality of memory dies of a memory system, the plurality of device commands associated with one or more operations of the memory system; determining an order for execution of the plurality of device commands based at least in part on respective amounts of a buffer allocated to the plurality of memory dies; allocating respective portions of the buffer to respective memory dies of the plurality of memory dies according to the order for execution of the plurality of device commands; and performing one or more of the plurality of device commands associated with the respective memory dies of the plurality of memory dies based at least in part on allocating the respective portions of the buffer.

Aspect 2: The method, apparatus, or non-transitory computer-readable medium of aspect 1, further including operations, features, circuitry, logic, means, or instructions, or any combination thereof for determining an order for processing the plurality of queues based at least in part on the respective amounts of the buffer allocated to the plurality of memory dies; processing one or more device commands of the plurality of device commands associated with a first queue based at least in part on determining the order for processing the plurality of queues; modifying a buffer request amount associated with the first queue based at least in part on processing the one or more device commands of the plurality of device commands associated with the first queue; and determining whether the buffer request amount satisfies a first threshold based at least in part on modifying the buffer request amount.

Aspect 3: The method, apparatus, or non-transitory computer-readable medium of aspect 2, further including operations, features, circuitry, logic, means, or instructions, or any combination thereof for modifying a flag associated with the first queue based at least in part on determining that the buffer request amount satisfies the first threshold.

Aspect 4: The method, apparatus, or non-transitory computer-readable medium of aspect 3, further including operations, features, circuitry, logic, means, or instructions, or any combination thereof for determining whether each queue of the plurality of queues have been processed based at least in part on respective flags of a plurality of flags associated with the plurality of queues.

Aspect 5: The method, apparatus, or non-transitory computer-readable medium of any of aspects 2 through 4, further including operations, features, circuitry, logic, means, or instructions, or any combination thereof for generating a buffer request associated with a first memory die of the plurality of memory dies associated with the first queue based at least in part on the one or more device commands.

Aspect 6: The method, apparatus, or non-transitory computer-readable medium of any of aspects 1 through 5, further including operations, features, circuitry, logic, means, or instructions, or any combination thereof for determining an order for processing the plurality of queues based at least in part on the respective amounts of the buffer allocated to the plurality of memory dies; identifying a first device command of the plurality of device commands associated with a first queue based at least in part on determining the order for processing the plurality of queues, the first queue associated with a first memory die of the plurality of memory dies; and determining whether a combination of a first quantity associated with the respective portions of the buffer allocated to the first memory die and a second quantity associated with a buffer request for the first device command satisfies a second threshold.

Aspect 7: The method, apparatus, or non-transitory computer-readable medium of aspect 6, further including operations, features, circuitry, logic, means, or instructions, or any combination thereof for determining to suppress a request for the second quantity associated with the buffer request for the first device command based at least in part on determining that the combination satisfies the second threshold.

Aspect 8: The method, apparatus, or non-transitory computer-readable medium of any of aspects 6 through 7, where allocating the respective portions of the buffer to the respective memory dies includes operations, features, circuitry, logic, means, or instructions, or any combination thereof for allocating the second quantity of the buffer to the first memory die based at least in part on determining that the combination does not satisfy the second threshold.

Aspect 9: The method, apparatus, or non-transitory computer-readable medium of any of aspects 6 through 8, further including operations, features, circuitry, logic, means, or instructions, or any combination thereof for storing the first quantity associated with the respective portions of the buffer allocated to the plurality of memory dies and the second quantity associated with the buffer request based at least in part on the buffer request, where determining whether the combination satisfies the second threshold is based at least in part on the storing.

Aspect 10: The method, apparatus, or non-transitory computer-readable medium of any of aspects 1 through 9, further including operations, features, circuitry, logic, means, or instructions, or any combination thereof for processing the plurality of queues based at least in part on transferring the plurality of device commands to the plurality of queues and transferring a second plurality of device commands to the plurality of queues associated with the respective memory dies of the plurality of memory dies of the memory system based at least in part on determining that the plurality of queues have been processed.

Aspect 11: The method, apparatus, or non-transitory computer-readable medium of any of aspects 1 through 10, further including operations, features, circuitry, logic, means, or instructions, or any combination thereof for outputting, to a host device, data associated with the one or more of the plurality of device commands based at least in part on performing the one or more of the plurality of device commands and deallocating the respective portions of the buffer based at least in part outputting the data.

Figure 8:
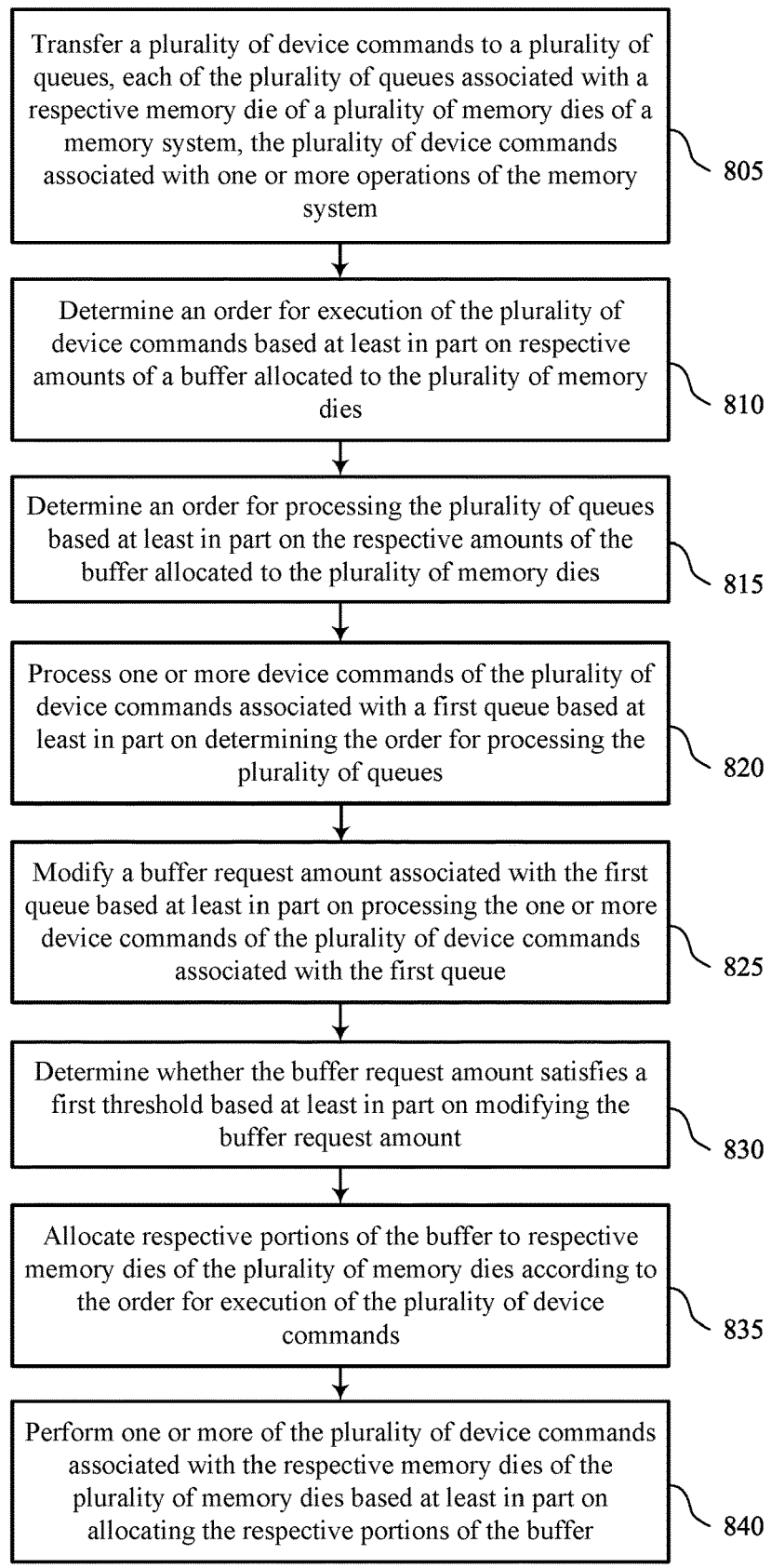

FIG. 8 illustrates a flowchart showing a method 800 that supports read buffer allocation balance between multiple memory dies in accordance with examples as disclosed herein. The operations of method 800 may be implemented by a memory system or its components as described herein. For example, the operations of method 800 may be performed by a memory system as described with reference to FIGS. 1 through 6. In some examples, a memory system may execute a set of instructions to control the functional elements of the device to perform the described functions. Additionally, or alternatively, the memory system may perform aspects of the described functions using special-purpose hardware.

At 805, the method may include transferring a plurality of device commands to a plurality of queues, each of the plurality of queues associated with a respective memory die of a plurality of memory dies of a memory system, the plurality of device commands associated with one or more operations of the memory system. The operations of 805 may be performed in accordance with examples as disclosed herein. In some examples, aspects of the operations of 805 may be performed by a command transfer component 625 as described with reference to FIG. 6.

At 810, the method may include determining an order for execution of the plurality of device commands based at least in part on respective amounts of a buffer allocated to the plurality of memory dies. The operations of 810 may be performed in accordance with examples as disclosed herein. In some examples, aspects of the operations of 810 may be performed by a command scheduler component 630 as described with reference to FIG. 6.

At 815, the method may include determining an order for processing the plurality of queues based at least in part on the respective amounts of the buffer allocated to the plurality of memory dies. The operations of 815 may be performed in accordance with examples as disclosed herein. In some examples, aspects of the operations of 815 may be performed by a command scheduler component 630 as described with reference to FIG. 6.

At 820, the method may include processing one or more device commands of the plurality of device commands associated with a first queue based at least in part on determining the order for processing the plurality of queues. The operations of 820 may be performed in accordance with examples as disclosed herein. In some examples, aspects of the operations of 820 may be performed by a command execution component 640 as described with reference to FIG. 6.

At 825, the method may include modifying a buffer request amount associated with the first queue based at least in part on processing the one or more device commands of the plurality of device commands associated with the first queue. The operations of 825 may be performed in accordance with examples as disclosed herein. In some examples, aspects of the operations of 825 may be performed by a buffer request component 650 as described with reference to FIG. 6.

At 830, the method may include determining whether the buffer request amount satisfies a first threshold based at least in part on modifying the buffer request amount. The operations of 830 may be performed in accordance with examples as disclosed herein. In some examples, aspects of the operations of 830 may be performed by a buffer manager component 635 as described with reference to FIG. 6.

At 835, the method may include allocating respective portions of the buffer to respective memory dies of the plurality of memory dies according to the order for execution of the plurality of device commands. The operations of 835 may be performed in accordance with examples as disclosed herein. In some examples, aspects of the operations of 835 may be performed by a buffer manager component 635 as described with reference to FIG. 6.

At 840, the method may include performing one or more of the plurality of device commands associated with the respective memory dies of the plurality of memory dies based at least in part on allocating the respective portions of the buffer. The operations of 840 may be performed in accordance with examples as disclosed herein. In some examples, aspects of the operations of 840 may be performed by a command execution component 640 as described with reference to FIG. 6.

It should be noted that the described techniques include possible implementations, and that the operations and the steps may be rearranged or otherwise modified and that other implementations are possible. Further, portions from two or more of the methods may be combined.

An apparatus is described. The following provides an overview of aspects of the apparatus as described herein:

Aspect 12: An apparatus, including: a memory system; and a controller coupled with the memory system and configured to cause the apparatus to: transfer a plurality of device commands to a plurality of queues associated with respective memory dies of a plurality of memory dies of the memory system, the plurality of device commands associated with one or more operations of the memory system; determine an order for execution of the plurality of device commands based at least in part on respective amounts of a buffer allocated to the plurality of memory dies; allocate respective portions of the buffer to respective memory dies of the plurality of memory dies according to the order for execution of the plurality of device commands; and perform one or more of the plurality of device commands associated with the respective memory dies of the plurality of memory dies based at least in part on allocating the respective portions of the buffer.

Aspect 13: The apparatus of aspect 12, where the controller is further configured to cause the apparatus to: determine an order for processing the plurality of queues based at least in part on the respective amounts of the buffer allocated to the plurality of memory dies; process one or more device commands of the plurality of device commands associated with a first queue based at least in part on the order for processing the plurality of queues; modify a buffer request amount associated with the first queue based at least in part on processing the one or more device commands of the plurality of device commands associated with the first queue; and determine whether the buffer request amount satisfies a first threshold based at least in part on modifying the buffer request amount.

Aspect 14: The apparatus of aspect 13, where the controller is further configured to cause the apparatus to: modify a flag associated with the first queue based at least in part on determining that the buffer request amount satisfies the first threshold.

Aspect 15: The apparatus of any of aspects 13 through 14, where the controller is further configured to cause the apparatus to: determine whether each queue of the plurality of queues have been processed based at least in part on respective flags of a plurality of flags associated with the plurality of queues.

Aspect 16: The apparatus of any of aspects 13 through 15, where the controller is further configured to cause the apparatus to: generate a buffer request associated with a first memory die of the plurality of memory dies associated with the first queue based at least in part on the one or more device commands.

Aspect 17: The apparatus of any of aspects 12 through 16, where the controller is further configured to cause the apparatus to: determine an order for processing the plurality of queues based at least in part on the respective amounts of the buffer allocated to the plurality of memory dies; identify a first device command of the plurality of device commands associated with a first queue based at least in part on determining the order for processing the plurality of queues, the first queue associated with a first memory die of the plurality of memory dies; and determine whether a combination of a first quantity associated with the respective portions of the buffer allocated to the first memory die and a second quantity associated with a buffer request for the first device command satisfies a second threshold.

Aspect 18: The apparatus of aspect 17, where the controller is further configured to cause the apparatus to: determine to suppress a request for the second quantity associated with the buffer request for the first device command based at least in part on determining that the combination satisfies the second threshold.

Aspect 19: The apparatus of any of aspects 17 through 18, where the controller configured to allocate the respective portions of the buffer to the respective memory dies is further configured to cause the apparatus to: allocate the second quantity of the buffer to the first memory die based at least in part on determining that the combination does not satisfy the second threshold.

Aspect 20: The apparatus of any of aspects 17 through 19, where the controller is further configured to cause the apparatus to: store the first quantity associated with the respective portions of the buffer allocated to the plurality of memory dies and the second quantity associated with the buffer request based at least in part on the buffer request, where determining whether the combination satisfies the second threshold is based at least in part on the storing.

Aspect 21: The apparatus of any of aspects 12 through 20, where the controller is further configured to cause the apparatus to: process the plurality of queues based at least in part on transferring the plurality of device commands to the plurality of queues; and transfer a second plurality of device commands to the plurality of queues associated with the respective memory dies of the plurality of memory dies of the memory system based at least in part on determining that the plurality of queues have been processed.

Aspect 22: The apparatus of any of aspects 12 through 21, where the controller is further configured to cause the apparatus to: output, to a host device, data associated with the one or more of the plurality of device commands based at least in part on performing the one or more of the plurality of device commands; and deallocate the respective portions of the buffer based at least in part outputting the data.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   one or more memory systems; and
   one or more controllers coupled with the one or more memory systems and configured to cause the apparatus to:
   transfer a plurality of device commands to a plurality of queues associated with respective memory dies of a plurality of memory dies of the one or more memory systems, the plurality of device commands associated with one or more operations of the one or more memory systems;
   determine an order for execution of the plurality of device commands based at least in part on respective amounts of a buffer allocated to the plurality of memory dies;
   process the plurality of device commands associated with the plurality of queues based at least in part on the order of execution of the plurality of device commands;
   allocate respective portions of the buffer to the respective memory dies of the plurality of memory dies based at least in part on processing the plurality of device commands; and
   perform one or more of the plurality of device commands associated with the respective memory dies of the plurality of memory dies based at least in part on allocating the respective portions of the buffer.

2. The apparatus of claim 1, wherein the one or more controllers are further configured to cause the apparatus to:
   determine an order for processing the plurality of queues based at least in part on the respective amounts of the buffer allocated to the plurality of memory dies;
   process one or more device commands of the plurality of device commands associated with a first queue based at least in part on the order for processing the plurality of queues;
   modify a buffer request amount associated with the first queue based at least in part on processing the one or more device commands of the plurality of device commands associated with the first queue; and
   determine whether the buffer request amount satisfies a first threshold based at least in part on modifying the buffer request amount.

3. The apparatus of claim 2, wherein the one or more controllers are further configured to cause the apparatus to:
   modify a flag associated with the first queue based at least in part on determining that the buffer request amount satisfies the first threshold.

4. The apparatus of claim 2, wherein the one or more controllers are further configured to cause the apparatus to:
   determine whether each queue of the plurality of queues have been processed based at least in part on respective flags of a plurality of flags associated with the plurality of queues.

5. The apparatus of claim 2, wherein the one or more controllers are further configured to cause the apparatus to:
   generate a buffer request associated with a first memory die of the plurality of memory dies associated with the first queue based at least in part on the one or more device commands.

6. The apparatus of claim 1, wherein the one or more controllers are further configured to cause the apparatus to:
   determine an order for processing the plurality of queues based at least in part on the respective amounts of the buffer allocated to the plurality of memory dies;
   identify a first device command of the plurality of device commands associated with a first queue based at least in part on determining the order for processing the plurality of queues, the first queue associated with a first memory die of the plurality of memory dies; and
   determine whether a combination of a first quantity associated with the respective portions of the buffer allocated to the first memory die and a second quantity associated with a buffer request for the first device command satisfies a second threshold.

7. The apparatus of claim 6, wherein the one or more controllers are further configured to cause the apparatus to:
   determine to suppress a request for the second quantity associated with the buffer request for the first device command based at least in part on determining that the combination satisfies the second threshold.

8. The apparatus of claim 6, wherein the one or more controllers configured to allocate the respective portions of the buffer to the respective memory dies is further configured to cause the apparatus to:
   allocate the second quantity of the buffer to the first memory die based at least in part on determining that the combination does not satisfy the second threshold.

9. The apparatus of claim 6, wherein the one or more controllers are further configured to cause the apparatus to:
   store the first quantity associated with the respective portions of the buffer allocated to the plurality of memory dies and the second quantity associated with the buffer request based at least in part on the buffer request, wherein determining whether the combination satisfies the second threshold is based at least in part on the storing.

10. The apparatus of claim 1, wherein the one or more controllers are further configured to cause the apparatus to:
process the plurality of queues based at least in part on transferring the plurality of device commands to the plurality of queues; and
transfer a second plurality of device commands to the plurality of queues associated with the respective memory dies of the plurality of memory dies of the one or more memory systems based at least in part on determining that the plurality of queues have been processed.

11. The apparatus of claim 1, wherein the one or more controllers are further configured to cause the apparatus to:
output, to a host device, data associated with one or more of the plurality of device commands based at least in part on performing the one or more of the plurality of device commands; and
deallocate the respective portions of the buffer based at least in part outputting the data.

12. A non-transitory computer-readable medium storing code comprising instructions which, when executed by a processor of an electronic device, cause the electronic device to:
transfer a plurality of device commands to a plurality of queues associated with respective memory dies of a plurality of memory dies of a memory system, the plurality of device commands associated with one or more operations of the memory system;
determine an order for execution of the plurality of device commands based at least in part on respective amounts of a buffer allocated to the plurality of memory dies;
process the plurality of device commands associated with the plurality of queues based at least in part on the order of execution of the plurality of device commands;
allocate respective portions of the buffer to the respective memory dies of the plurality of memory dies based at least in part on processing the plurality of device commands; and
perform one or more of the plurality of device commands associated with the respective memory dies of the plurality of memory dies based at least in part on allocating the respective portions of the buffer.

13. The non-transitory computer-readable medium of claim 12, wherein the instructions, when executed by the processor of the electronic device, further cause the electronic device to:
determine an order for processing the plurality of queues based at least in part on the respective amounts of the buffer allocated to the plurality of memory dies;
process one or more device commands of the plurality of device commands associated with a first queue based at least in part on the order for processing the plurality of queues;
modify a buffer request amount associated with the first queue based at least in part on processing the one or more device commands of the plurality of device commands associated with the first queue; and
determine whether the buffer request amount satisfies a first threshold based at least in part on modifying the buffer request amount.

14. The non-transitory computer-readable medium of claim 13, wherein the instructions, when executed by the processor of the electronic device, further cause the electronic device to modify a flag associated with the first queue based at least in part on determining that the buffer request amount satisfies the first threshold.

15. The non-transitory computer-readable medium of claim 13, wherein the instructions, when executed by the processor of the electronic device, further cause the electronic device to determine whether each queue of the plurality of queues have been processed based at least in part on respective flags of a plurality of flags associated with the plurality of queues.

16. The non-transitory computer-readable medium of claim 13, wherein the instructions, when executed by the processor of the electronic device, cause the electronic device to generate a buffer request associated with a first memory die of the plurality of memory dies associated with the first queue based at least in part on the one or more device commands.

17. The non-transitory computer-readable medium of claim 12, wherein the instructions, when executed by the processor of the electronic device, further cause the electronic device to:
determine an order for processing the plurality of queues based at least in part on the respective amounts of the buffer allocated to the plurality of memory dies;
identify a first device command of the plurality of device commands associated with a first queue based at least in part on determining the order for processing the plurality of queues, the first queue associated with a first memory die of the plurality of memory dies; and
determine whether a combination of a first quantity associated with the respective portions of the buffer allocated to the first memory die and a second quantity associated with a buffer request for the first device command satisfies a second threshold.

18. The non-transitory computer-readable medium of claim 17, wherein the instructions, when executed by the processor of the electronic device, further cause the electronic device to determine to suppress a request for the second quantity associated with the buffer request for the first device command based at least in part on determining that the combination satisfies the second threshold.

19. The non-transitory computer-readable medium of claim 17, wherein the instructions, when executed by the processor of the electronic device, that cause the electronic device to allocate the respective portions of the buffer to the respective memory dies, further cause the electronic device to allocate the second quantity of the buffer to the first memory die based at least in part on determining that the combination does not satisfy the second threshold.

20. A method, comprising:
transferring a plurality of device commands to a plurality of queues, each of the plurality of queues associated with a respective memory die of a plurality of memory dies of a memory system, the plurality of device commands associated with one or more operations of the memory system;
determining an order for execution of the plurality of device commands based at least in part on respective amounts of a buffer allocated to the plurality of memory dies;
processing the plurality of device commands associated with the plurality of queues based at least in part on the order of execution of the plurality of device commands;
allocating respective portions of the buffer to respective memory dies of the plurality of memory dies based at least in part on processing the plurality of device commands; and performing one or more of the plurality of device commands associated with the respective memory dies of the plurality of memory dies based at least in part on allocating the respective portions of the buffer.

\* \* \* \* \*